United States Patent [19]

Coiquaud

[11] 4,279,049
[45] Jul. 21, 1981

[54] PROCESS FOR MANUFACTURING FOOTWEAR FROM A PLASTIC MATERIAL SUCH AS POLYURETHANE

[75] Inventor: Michel Coiquaud, Bordeaux, France

[73] Assignee: Etablissements Simon Souillac, France

[21] Appl. No.: 91,935

[22] Filed: Nov. 7, 1979

[30] Foreign Application Priority Data

May 29, 1979 [FR] France .................................. 79 13582
Sep. 28, 1979 [FR] France .................................. 79 24217

[51] Int. Cl.³ .......................... A43D 9/00; A43B 3/12
[52] U.S. Cl. .................................... 12/142 S; 36/11.5
[58] Field of Search ........................ 12/142 S; 36/11.5

[56] References Cited

U.S. PATENT DOCUMENTS

| 3,552,039 | 1/1971 | Fukuoka | 36/11.5 |
| 3,577,662 | 5/1971 | Fukuoka | 36/11.5 |
| 3,698,107 | 10/1972 | Fukuoka | 36/11.5 |

Primary Examiner—Patrick D. Lawson
Attorney, Agent, or Firm—Scully, Scott, Murphy & Presser

[57] ABSTRACT

A process is disclosed for molding plastic footwear composed of polyurethane. Despite the unitary construction of this footwear, the use of polyurethane permits the footwear to be provided with an appearance substantially identical to a traditional article of footwear. The process is particularly adaptable to the preparation of footwear of the sandal type.

13 Claims, 4 Drawing Figures

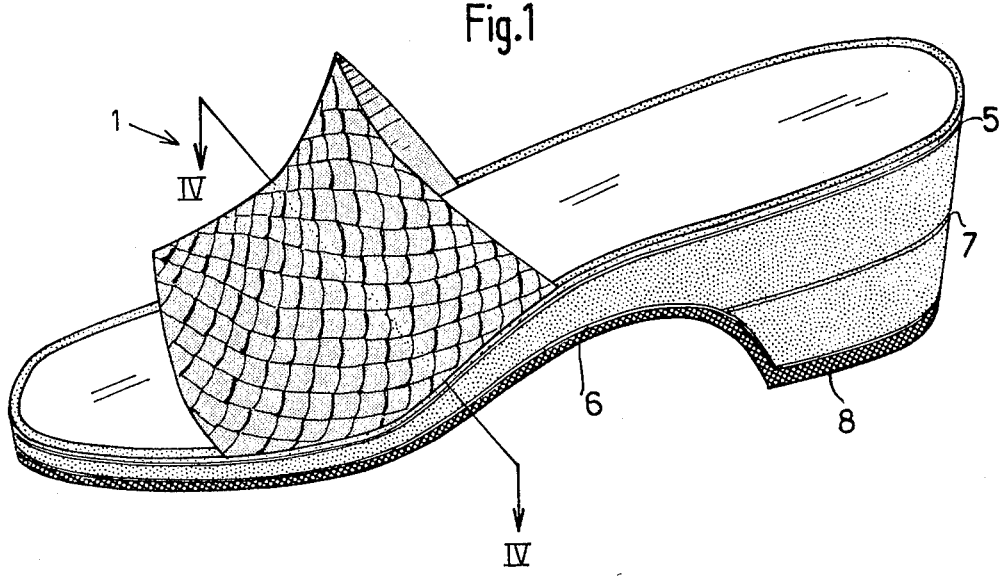
Fig. 1
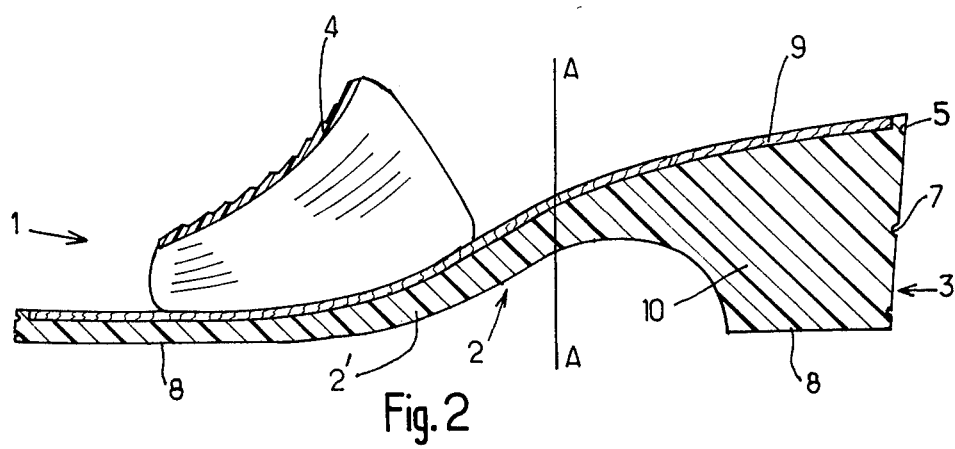
Fig. 2
Fig. 3
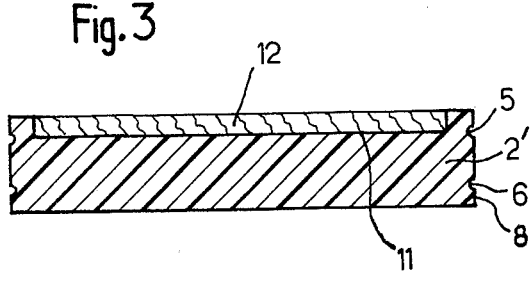
Fig. 4
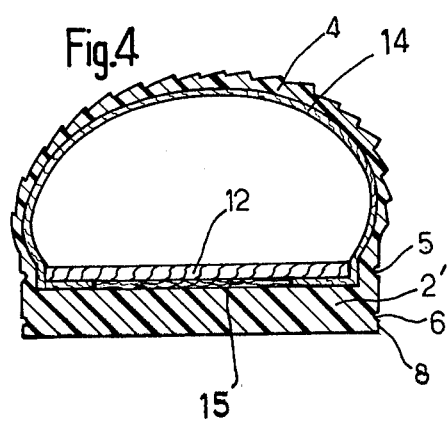

PROCESS FOR MANUFACTURING FOOTWEAR FROM A PLASTIC MATERIAL SUCH AS POLYURETHANE

The present invention relates to a process for manufacturing footwear from a plastic material such as polyurethane.

It relates more particularly, but not exclusively, to the manufacture of footwear of the sandal type for summer which comprise essentially a sole and upper (or top) with an open or closed end.

It is known that the manufacture of this type of footwear is carried out by mounting an upper made from leather or from a synthetic material on an inner sole, by means of a wooden or plastic last reproducing the volume of the foot.

This assembly is then bonded to a sole adapted to the inner sole.

It is evident that because of the type of materials used in this manufacture, their multiplicity and the different mounting operations involving very often qualified labour, the cost price of this footwear is relatively high.

Moreover, sandals are also manufactured in a single piece from a plastic material such as compact or expanded polyvinyl chloride. However, these sandals have an appearance very different from that of traditionally manufactured footwear. Consequently, although the cost prices are considerably reduced, these products lose their value because their manufacture by moulding in a single piece is apparent.

The invention has then as its aim to depart from the conventional moulding techniques by a series of transformations so as to obtain a new product with an appearance identical to that of a traditional sandal.

For this, the process of the invention consists:

in a first phase, in producing by moulding a material such as polyurethane, a rough sandal shape comprising a sole with, moulded therewith, an upper for covering the foot at least partially and this, by means of a mould allowing, for each of the essential parts of the rough shape, the surface texture of the traditional materials used in the model which it is desired to imitate to be very exactly reproduced, in painting in a second phase, each of the different parts of the rough shape in the corresponding colour of the rough shape which it is desired to imitate, and in effecting, in a third phase, a brushing of the rough shape in a way similar to the brushing effected by a tanner on real leather.

In another connection, the process of the invention may furthermore comprise the addition of an insole or "inner cleanliness sole" made from leather or from a synthetic material bonded to the upper face of the moulded sole.

In this case, there is provided during moulding, in the upper face of the sole, a cavity inside which is fixed the insole, e.g. by bonding.

According to another characteristic of the invention, with a view to increasing the comfort of the shoe and improving its appearance as a traditionally assembled shoe, the upper is lined with a leather or textile lining by sliding a sleeve made from the chosen material around the last at the level where the upper is to be moulded.

The invention also relates to improvements aimed at increasing the rigidity of the sole particularly at the curve of the heel.

According to another characteristic of the invention this result is obtained by inserting in the mould a reinforcing structure which is at least partially coated with the moulding material during casting or injection.

These reinforcing structures may in particular consist of arch pieces, stiffening rods, with or without end holders, inserts made from polystyrene, rigid polyurethane, metal or any other material.

Thus there is obtained, in a single piece, a shoe or article of footwear comprising a sole and a one-piece upper which has the finished appearance and the rigidity of a traditional shoe and to which there may be added, if desired, for example an inner cleanliness sole, buckles, clips or toe pieces.

Another improvement according to the parent patent consists in disposing on the last, before moulding, a leather, a substitute leather or textile lining, the moulding then being carried out on this last.

These improvements enable a completely lined article of footwear to be obtained, which presents increased comfort and which is not easily distinguished from an article obtained in the traditional way.

Of course the invention relates also to the articles of footwear or shoes obtained in accordance with the processes previously described.

An embodiment of the invention will be described hereafter, by way of non limiting example, with reference to the accompanying drawings in which:

FIG. 1 is a perspective view of a sandal constructed in accordance with the process of the invention;

FIG. 2 is a longitudinal section of the sandal shown in FIG. 1;

FIG. 3 is a section along A—A of FIG. 2; and

FIG. 4 is a section along IV—IV of FIG. 1, showing another embodiment of the invention.

Such as it is shown, sandal 1 is obtained from a rough shape made from polyurethane obtained by moulding. It comprises essentially, moulded together, a sole 2 with a high heel 3 and an upper 4 with open end.

The mould provided for this purpose is obtained by electro-forming so as to reproduce exactly the shapes and the surface texture of a model assembled in a traditional way.

Thus, in the example shown, the outer face of upper 4 is shaped so as to imitate an upper made from thin leather strips with interlaced top. Similarly, the side edge of sole 2 comprises grooves 5,6 and 7 marking the delimitation of body 2' of the sole with, on the one hand, the wearing sole 8 and heel 3 and, on the other hand, the inner mounting sole 9. Moreover, the outer surface 10 of heel 3 reproduces the surface texture of the covering leather currently used.

Different parts of the rough shape are covered in different ways, so as to suggest that it is a question of assembled parts and not a moulded unit.

By way of example, upper 4 may be made in a different colour from the sole and, under this latter, the wearing sole 8 may be painted black as is generally the case with an expensive sandal. Moreover, the covering (surface 10) of heel 3 may for example be of a colour similar to that of upper 4 or else to that of body 2' of the sole (principally in the case where this latter is thick).

With a view to increasing the comfort of the shoe and giving an appearance of an article assembled in a traditional way, the upper face of the sole has a cavity 11 (FIG. 3) delimited by a peripheral flange corresponding to the edge of the inner mounting sole 9 inside which is fixed if required, by bonding, an inner cleanliness sole 12 made for example from leather or a plastic material.

Thus, with this set of transformations effected on the rough shape, there is obtained a shoe having an outward appearance entirely compatible with that of a traditional shoe. It should be noted that the invention arrives at this result through the combination of the following factors:

the choice of the material used for the rough shape, the moulding process and the construction of the mould used (electro-forming), the colouring by painting of the different parts of the rough shape, this colouring being made possible because of the properties of the material used, the treatment by brushing of the different parts of the rough shape, once they have been painted; in this case also, the effect obtained is due to the properties of the material used at the surface thereof, to the moulding method and to the nature of the paint used, the insertion of an inner cleanliness sole 12, visible in the case of sandals and which may be made from a traditional material.

With reference to FIG. 4, the upper 4 of the shoe may be lined with a leather or textile lining 14 in the form of a sleeve which covers the internal surface of upper 4 as well as a part of the sole 2 under the inner cleanliness sole 12.

According to the invention, this result is obtained by fitting the sleeve around the last at the level where the upper portion is to be moulded. So that it may take on correctly the shape of the last, the sleeve comprises in its region to be covered by the inner cleanliness sole 12, a part made from a resilient material 15.

Once the sleeve is placed on the last, moulding is carried out. When removing the article from the mould, the sleeve is fixed to the shoe due to the bonding properties of polyurethane during its polymerisation.

The last operation consists in touching up the edges of upper 4 so that the edge of the sleeve is visible whose appearance is quite comparable to that of a traditional lining.

I claim:

1. A process for manufacturing plastic footwear comprising:
    a. molding polyurethane into the shape of footwear, having at least a sole portion and an upper portion designed to at least partially cover a foot, by utilizing a mold having a textured surface to imitate a traditional material, said upper portion and said sole portion being molded together;
    b. painting each portion of the shape in the color of a traditional material;
    c. brushing the shape in a manner as real leather is tanned.

2. A process for manufacturing plastic footwear as claimed in claim 1, further including molding a reinforcing structure into the sole to increase its rigidity.

3. A process for manufacturing plastic footwear as claimed in claim 2, said step of molding a reinforcing structure including the step of molding an arch piece into the sole to increase its rigidity.

4. A process of manufacturing plastic footwear as claimed in claim 2, said step of molding a reinforcing structure including the step of molding at least one stiffening rod into the sole.

5. A process of manufacturing plastic footwear as claimed in claim 2, said step of molding a reinforcing structure including the step of molding a rigid plastic material insert into the sole.

6. A process of manufacturing plastic footwear as claimed in claim 2, said step of molding a reinforcing structure including the step of molding a metal insert into the sole.

7. A process of manufacturing plastic footwear as claimed in claim 1, including the step of adding a leather insole to the upper face of the molded sole.

8. A process of manufacturing plastic footwear as claimed in claim 2, including the step of molding a cavity in the upper face of the sole, and bonding a leather insole into the molded cavity in the upper face of the sole.

9. A process of manufacturing plastic footwear as claimed in claim 1, said molding step including the step of utilizing a mold obtained by electroforming and having a design to reproduce the characteristics of leather on the upper and the characteristic of a covering leather for the heel.

10. A process of manufacturing plastic footwear as claimed in claim 9, said step of molding including the step of utilizing a mold providing grooves marking the boundries of different portions of the footwear.

11. A process of manufacturing plastic footwear as claimed in claim 1, including the step of lining at least the upper with a sleeve around the last before molding, and subsequently molding on the lining.

12. A process of manufacturing plastic footwear as claimed in claim 11, in which the lining comprises, in the region covered by the inner sole, a portion made from a resilient material, whereby it assumes the shape of the last.

13. A plastic article of footwear obtained according to the process of claim 1.

* * * * *